(12) United States Patent
Parimi

(10) Patent No.: US 7,739,071 B2
(45) Date of Patent: Jun. 15, 2010

(54) SYSTEM VALIDATION USING VALIDATION PROGRAMS DEPICTED USING MARKUP LANGUAGE

(75) Inventor: Rakesh K. Parimi, New Windsor, NY (US)

(73) Assignee: International Business Machines Corporation, Armonk, NY (US)

(*) Notice: Subject to any disclaimer, the term of this patent is extended or adjusted under 35 U.S.C. 154(b) by 272 days.

(21) Appl. No.: 11/847,586

(22) Filed: Aug. 30, 2007

(65) Prior Publication Data

US 2009/0062953 A1 Mar. 5, 2009

(51) Int. Cl.
*G01M 19/00* (2006.01)
(52) U.S. Cl. .................. 702/123; 707/100; 715/513
(58) Field of Classification Search ............ 702/123; 707/100; 715/513; 717/101, 105, 178; 700/121; 709/232
See application file for complete search history.

(56) References Cited

U.S. PATENT DOCUMENTS

| | | | |
|---|---|---|---|
| 6,535,883 B1* | 3/2003 | Lee et al. ................ 707/100 |
| 6,671,570 B2 | 12/2003 | Schulze | |
| 6,846,684 B1 | 1/2005 | Yazback et al. | |
| 7,047,099 B2 | 5/2006 | Shanmugasundram et al. | |
| 7,089,530 B1 | 8/2006 | Dardinski et al. | |
| 7,096,465 B1 | 8/2006 | Dardinski et al. | |
| 7,162,534 B2 | 1/2007 | Schleiss et al. | |
| 2006/0041838 A1* | 2/2006 | Khan ..................... 715/513 |
| 2008/0127041 A1* | 5/2008 | Gura .................... 717/101 |

\* cited by examiner

*Primary Examiner*—John H Le
(74) *Attorney, Agent, or Firm*—Steven Capella; Hoffman Warnick LLC

(57) ABSTRACT

System validation using validation programs for a plurality of root functions depicted using a markup language is disclosed. One embodiment of a method includes establishing a validation program template defining a style of input/output usable by a plurality of root functions to be performed by at least one of a plurality of systems; generating a validation program for each of the plurality of root functions based on the validation program template; establishing a markup language representation of each of the plurality of validation programs and corresponding root function; depicting a composite validation program for a composite function including a plurality of root functions using the markup language representation of the plurality of validation programs for the plurality of root functions in the composite function; and validating at least one of the plurality of systems by validating the composite function using the validation programs depicted in the composite validation program.

20 Claims, 3 Drawing Sheets

SYSTEM VALIDATION USING VALIDATION PROGRAMS DEPICTED USING MARKUP LANGUAGE

BACKGROUND

1. Technical Field

The disclosure relates generally to a manufacturing execution system (MES), and more particularly, to system validation.

2. Background Art

In a modern manufacturing setting, such as an integrated circuit (IC) chip fabricator, a large variety of equipment may be involved in making a product. In order to control the various functions, manufacturing execution systems (MES) are used to collectively control the wide variety of systems (e.g., equipment and/or software) that provide the necessary functions used in the manufacturing process. One challenge is validating that a particular function is performed correctly when given a particular input. In particular, each system may have its own language (i.e., not just software language, but performance metrics) it uses to perform the function. Currently, each system must be validated separately using a customized validation program for each function. There is no mechanism available to perform a validation across different systems other than combining customized validation programs. Accordingly, the overall validation task is a very time consuming and resource intensive task.

SUMMARY

System validation using validation programs for a plurality of root functions depicted using a markup language is disclosed. One embodiment of a method includes establishing a validation program template defining a style of input/output usable by a plurality of root functions to be performed by at least one of a plurality of systems; generating a validation program for each of the plurality of root functions based on the validation program template; establishing a markup language representation of each of the plurality of validation programs and corresponding root function; depicting a composite validation program for a composite function including a plurality of root functions using the markup language representation of the plurality of validation programs for the plurality of root functions in the composite function; and validating at least one of the plurality of systems by validating the composite function using the validation programs depicted in the composite validation program.

A first aspect of the disclosure provides a method of validating at least one of a plurality of systems, the method comprising: establishing a validation program template defining a style of input/output usable by a plurality of root functions to be performed by at least one of the plurality of systems; generating a validation program for each of the plurality of root functions based on the validation program template; establishing a markup language representation of each of the plurality of validation programs and corresponding root function; depicting a composite validation program for a composite function including a plurality of root functions using the markup language representation of the plurality of validation programs for the plurality of root functions in the composite function; and validating at least one of the plurality of systems by validating the composite function using the validation programs depicted in the composite validation program.

A second aspect of the disclosure provides a system for validating at least one of a plurality of systems, the system comprising: means for establishing a validation program template defining a style of input/output usable by a plurality of root functions to be performed by at least one of the plurality of systems; means for generating a validation program for each of the plurality of root functions based on the validation program template; means for establishing a markup language representation of each of the plurality of validation programs and corresponding root function; means for depicting a composite validation program for a composite function including a plurality of root functions using the markup language representation of the plurality of validation programs for the plurality of root functions in the composite function; and means for validating at least one of the plurality of systems by validating the composite function using the validation programs depicted in the composite validation program.

A third aspect of the disclosure provides a program product stored on a computer-readable medium, which when executed, validates at least one of a plurality of systems, the program product comprising program code for performing the following: establishing a validation program template defining a style of input/output usable by a plurality of root functions to be performed by at least one of the plurality of systems; generating a validation program for each of the plurality of root functions based on the validation program template; establishing a markup language representation of each of the plurality of validation programs and corresponding root function; depicting a composite validation program for a composite function including a plurality of root functions using the markup language representation of the plurality of validation programs for the plurality of root functions in the composite function; and validating at least one of the plurality of systems by validating the composite function using the validation programs depicted in the composite validation program.

A fourth aspect of the disclosure provides a computer-readable medium that includes computer program code to enable a computer infrastructure to validate at least one of a plurality of systems, the computer-readable medium comprising computer program code for performing the processes of the disclosure.

An fifth aspect of the disclosure provides a business method for validating at least one of a plurality of systems, the business method comprising managing a computer infrastructure that performs each of the processes of the disclosure; and receiving payment based on the managing process.

A sixth aspect of the disclosure provides a method of generating a system for validating at least one of a plurality of systems, the method comprising: obtaining a computer infrastructure; and deploying means for performing each of the processes of the disclosure to the computer infrastructure.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

I. Introduction

The disclosure relates to a system, method and program product for performing validation of at least one of a plurality of systems in, for example, a manufacturing execution system. "Validation" is defined as verification of results for a set of (singular or multitude) function(s) across at least one of a plurality of systems. A "system" is defined as equipment and/or software application that has a function(s) it performs. A system performs the functions when it is given an input and is asked to do some work (i.e., the function) and thereafter produces an output. Both input and output can be one or more values.

Figure 1:
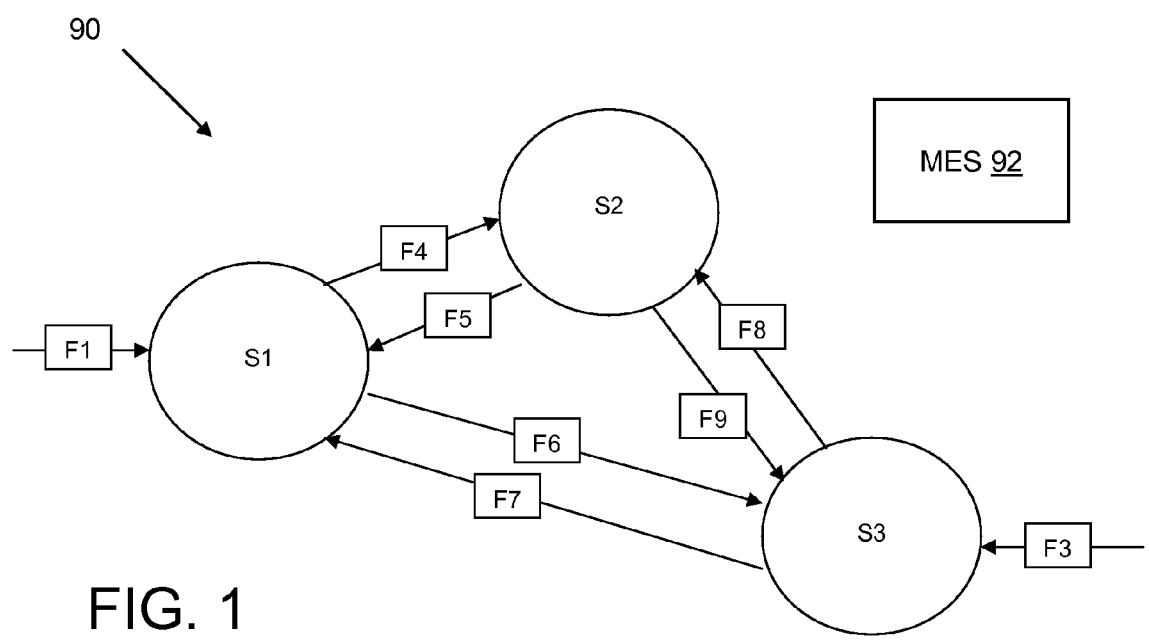
FIG. 1 shows an illustrative environment in which function validation is implemented according to the disclosure.

FIG. 1 shows an illustrative environment 90 in which the disclosure may be applied. In FIG. 1, root functions (F1-F9) are implemented across a plurality of systems (S1-S3) for performing validation (e.g., for software testing). The term "root" is used to differentiate a more fundamental function from a composite function, defined elsewhere herein. System S1-S3 may be under the control of a manufacturing execution system (MES) 92, as is known in the art. Any number of root functions and/or systems may be included. In the illustration, root functions F1-F9 are software applications or programs. It is understood, however, that the teachings of the disclosure are not necessarily limited to this particular setting, and can be applied to more generally to systems in other forms such as equipment (hardware), equipment/software combinations or any other type of system requiring validation. In any setting, a validation rule is implemented by a validation program (e.g., a Java program) that does the task of verifying that for a given input, a root function executed as it was supposed to, thus validating a related system. Because root functions of software applications are more complex than mathematical functions, e.g., an input can be of any type and a function of a software application can have varied set of inputs from other application(s), an extensible markup language is used for simplifying the complexity and creating commonality across functions of software applications.

Environment 90 includes three software applications: S1, S2 and S3, which perform various root functions F1-F9, as shown graphically. Root functions F1-F9 may be categorized as user functions, inter-system functions or composite functions. User functions are those involving a human operator. For example, F1 may be a user function call on system S1, e.g., graphical user interface (GUI) operation, and F3 may be a user function call on system S3, e.g., remote method call. Inter-system functions are those that require more than one system's involvement in completion of the function. For example, F3 to F9 may be inter-system functions in which a system initiated function call is based on the nature of the initially requested function (by user or by another system) to another system. Composite functions are a sequence of functions, which may include single user functions and/or inter-system functions, e.g., F1→F4→F9→F7 may be a composite function. There are many possibilities for how a requested function by a user can get executed. Adding to the complexity is that some systems, e.g., system S2, may have some extra logic whereby it can initiate functions F5 and F9 to systems S1 and S3, respectively, ultimately expecting a response back, thereby completing the executing of a function initiated by system S2.

Rather than generating a customized validation program for each composite function, a validation program template is established defining a style of input/output usable by a plurality of root functions F1-F9 to be performed by at least one system S1-S3. A validation program is generated for each of the plurality of root functions based on the validation program template. A markup language representation of each of the plurality of validation programs and corresponding root function is then established. A composite validation program for a composite function including a plurality of root functions can then be depicted using the markup language representation of the plurality of validation programs for the plurality of root functions in the composite function. Validation of at least one of the plurality of systems that use the composite function can be performed using the validation programs depicted in the composite validation program.

II. System Overview

Figure 2:
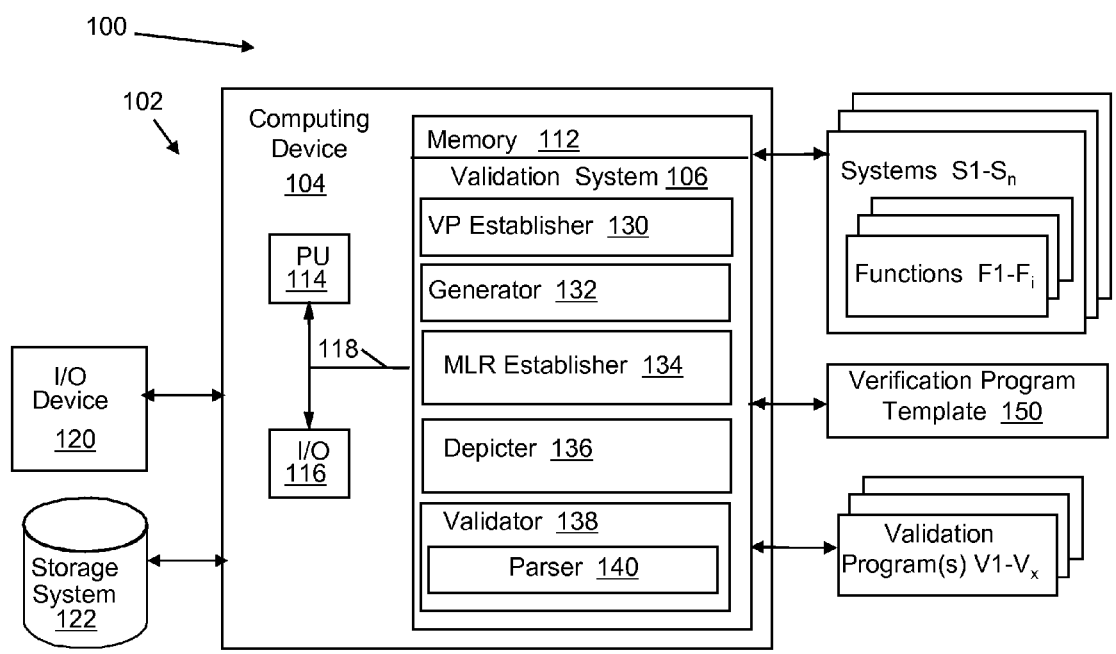
FIG. 2 shows embodiments of a system for function validation according to the disclosure.

Turning to the drawings, FIG. 2 shows an illustrative environment 100 for system validation. To this extent, environment 100 includes a computer infrastructure 102 that can perform the various process steps described herein for system validation. In particular, computer infrastructure 102 is shown including a computing device 104 that comprises a validation system 106, which enables computing device 104 to validate system(s) by performing the processes of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as validation system 106, that is stored in memory 112 and/or storage system 122. While executing computer program code, processor 114 can read and/or write data, such as validation data, to/from memory 112, storage system 122, and/or I/O interface 116. Bus 118 provides a communications link between each of the components in computing device 104. I/O device 116 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and validation system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, validation system 106 enables computing infrastructure 102 to validate at least one of a plurality of systems S1-Sn, and may be provided as part of MES 92 (FIG. 1) or as a separate system. To this extent, validation system 106 is shown including a validation program (VP) establisher 130, a generator 132, a markup language representation (MLR) establisher 134, depicter 136 and validator 138 including a parser 140. Operation of each of these systems is discussed further herein. However, it is understood that some of the various systems shown in FIG. 2 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100. A number of systems S1-Sn, each using one or more root functions F1-Fi are also illustrated. Root functions F1-Fi typically include at least one user function and at least one inter-system function that calls on more than one of the plurality of systems.

III. Operational Methodology

Figure 3:
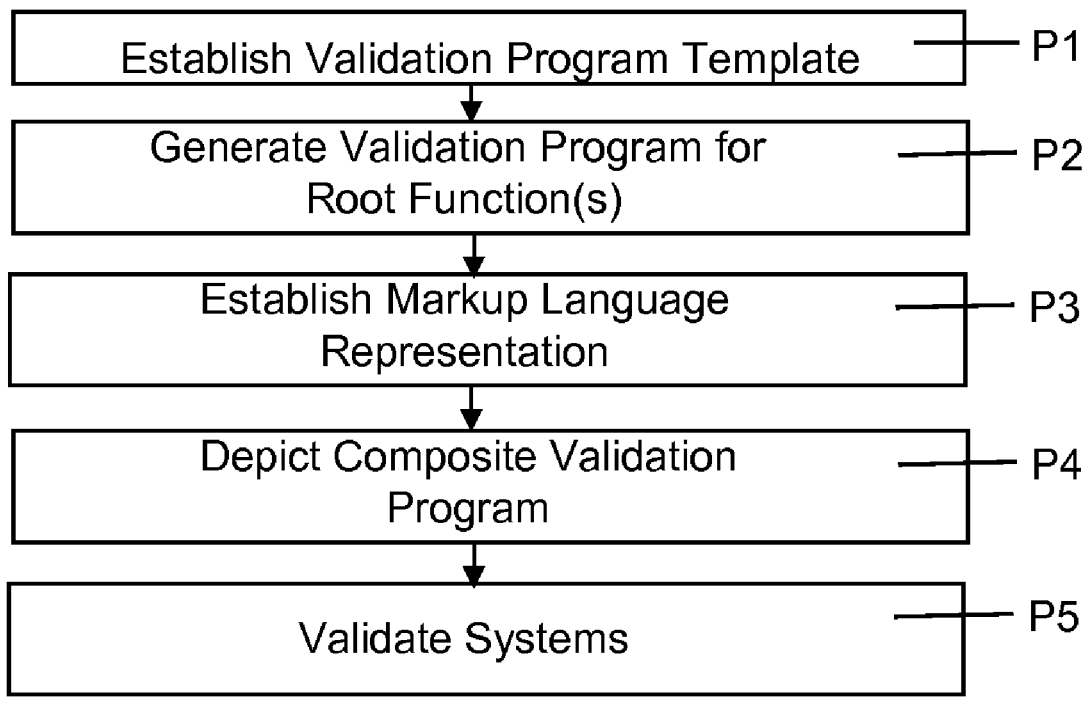
FIG. 3 shows embodiments of operational methodology for the system of FIG. 2 according to the disclosure.

Referring to FIG. 3 in conjunction with FIGS. 1-2, embodiments of a method of validating at least one of plurality of systems S1-Sn (hereinafter "systems S1-Sn") will now be described.

In process P1, VP establisher 130 establishes a validation program template 150 defining a style of input/output usable by a plurality of root functions F1-Fi to be performed by at least one of systems S1-Sn. Validation program template 150 defines the interfaces for the styles of inputs and outputs that can be later customized for particular root functions F1-Fi (note i most likely does not equal n). In, for example, a Java language, validation program template 150 may be a Java Interface. The required styles of inputs and outputs are a choice of the developer designing validation program template 150. In any event, validation program template 150 should be usable for validating as many root functions F1-Fi as possible. A number of validation program templates 150 may be established, if necessary. VP establisher 130 may be automated or may be user implemented, i.e., developer writing code to establish the verification program template. In one embodiment, validation program template 150 is created as an output of developed code (maybe written in Java or another programming language) for automated template generation.

The developer needs to know the format and structure of the validation program template so that given the validation requirements, i.e., what root functions need to be verified or validated, the developer can produce code to achieve the desired validation and produce standardized validation program template output.

In process P2, generator 132 generates a validation program for each of the plurality of root functions F1-Fi based on the validation program template. Generator 132 may be a developer drafting code following a semi automated process. The process may begin with defining a basic validation program interface. The intent of having such an interface specification is so that every validation program implemented by the developer complies with the interface specifications. The interface specifications are required for the validator 138. Validator 138 creates an instance of a validation program using the template rules. In any event, generator 132 generates a validation program V1-Vx for each root function F1-Fi, i.e., for user and inter-system functions. Corresponding root functions and validation programs may be denoted as follows: F1:=V1, F2:=V2, F3:=V3, etc. Note, variable x does not necessarily equal i, the latter being the total number of functions, since some functions may be sufficiently similar that they share a root function. Validation programs V1-Vx are reusable between similar or identical root functions. As noted above, root functions F1-Fi typically include at least one user function and at least one inter-system function that calls on more than one of the plurality of systems.

In process P3, MLR establisher 134 establishes a markup language representation of each of the plurality of validation programs and corresponding root function. That is, for each validation program and root function correspondence, there is an entry in a markup language such that when a validation of a root function Fy is necessary, its corresponding validation program Vy can be recalled. In one embodiment, the markup language may include extensible markup language (XML), standard generalized markup language (SGML), IBM generalized markup language (GML), etc. The fields used may vary depending user preference. Example fields may include: <function>, <validationprogram>, <inputs>, <input>, <outputs>, <output>, etc.

In process P4, depicter 136 depicts a composite validation program for a composite function including a plurality of root functions using the markup language representation of the plurality of validation programs for the plurality of root functions in the composite function. The depiction may take a variety of forms. For a non-composite function, depicter 136 may depict a root function F4:=F1($u$), implying that function F4 is verified by taking output of root function F1's parameter named 'u' and giving that as input to function F4's validation program, which is V4. So F4:=F1($u$) is the same as F4:=V4 (F1($u$)). In this sense, depicter 136 may use an output of at least one validation program for a first root function F while depicting a validation program of a second root function.

EXAMPLE 1

$$F4:=F1(u)$$

```
<function ID="F1">
    <validationprogram ID="V1">
        <outputs>
            <output>n</output>
            <output>m</output>
```

```
        </outputs>
      </validationprogram>
    </function>
    <function ID="F4">
      <validationprogram ID="V4">
        <inputs>
          <input>n<function ID="F1"></function></input>
        </inputs>
      </validationprogram>
    </function>
```

For a composite function, e.g., F5:=F3(n)→F8(m), depicter 136 may depict function F5 by taking output 'n' from F3 (V3) and giving that as input to F8 (V8) and finally taking output 'm' from F8 (V8) and giving that as input to V5. So, F5:=F3(n)→F8(m) is the same as F5:=V5(F3(n)→F8). This depiction notation provides flexibility to represent a small number of large composite functions with ease.

EXAMPLE 2

F5:=F3(n)→F8(m)

```
<function ID="F5">
  <validationprogram ID="V3">
    <inputs><input>m<function ID="F8"><input>n<function ID="F3"></function></function></input></inputs>
  </validationprogram>
</function>
<function ID="F3">
  <validationprogram ID="V3">
    <outputs>
      <output>n</output>
      <output>n2</output>
    </outputs>
  </validationprogram>
</function>
<function ID="F8">
  <validationprogram ID="V8">
    <outputs>
      <output>m</output>
      <output>m2</output>
    </outputs>
  </validationprogram>
</function>
```

A validation program is generated for each root function only once, yet complex composite functions (e.g., function F5 in case 2 above) can still be addressed. Depicter 136 may store each composite validation program formed for later recall, e.g., in storage system 122.

In process P5, validator 138 validates at least one of the plurality of systems S1-Sn by validating the composite function for the at least one system using the validation programs depicted in the composite validation program. Validator 138 may employ any now known or later developed validation control programs. Validator 138 is a smart program that can invoke all the validation programs for the set of functions listed in the template for validation. To accomplish this, validator 138 knows the interface specifications for a validation program. Validator 138 also knows the template rules, set of functions it needs to verify. Validator 138 also knows how to invoke parser 140. Parser 140 reads the functions listed in template encoded via, e.g., extensible markup language, and deciphers what validation program needs to be invoked for what function along with the set of inputs and outputs.

In one embodiment, using EXAMPLE 2 for purposes of description, validator 138 first gets the list of root functions from parser 140, uses parser 140 to get the first function that needs to be validated, invokes validation program V3 and gets output n from V3. Validator 138 then invokes validation program V8, input n (from V3) and gets output m of V8. Validator 138 then invokes validation program V5 with input m. To accomplish invoking a validation program, validator 138 must know the interface specifications and have access to the validation program. Validator 138 uses parser 140 to get the next function that needs to be validated and executes the logic as described in process P3 for that function.

In one embodiment according to the disclosure, validator 138 is capable of using parser 140 to parse the composite validation program at run time. In this case, parser 140 may use a reflection application programming interface (API), e.g., Java Reflection API. Validator 138 may also recall stored composite validation programs V1-Vx to depict another composite function. In this fashion, validation programs for new and more complex composite functions can be generated. As such, validation programs can be parsed at runtime for validating composite functions without any code written specifically for that composite function. In essence, in the above example, with for example six validation programs implemented, a validation of more than 50 root and composite functions, and thus related system(s), can be completed. Application of this technique has proven extremely cost effective for MES 92 systems, where complex composite functions are common.

IV. Conclusion

As discussed herein, various systems and components may be described as "obtaining" or "recalling" data. It is understood that the corresponding data can be obtained/recalled using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for system validation, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to function validation. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, such as storage system 122, magnetic tape, a removable computer diskette, a random access memory (RAM), a read-only memory (ROM), a tape, a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processing unit 104 coupled directly or indirectly to memory elements through a system bus 118. The memory elements can include local memory, e.g., memory 112, employed during actual execution of the program code, bulk storage (e.g., memory system 122), and cache memories which provide temporary storage of at least some program code in order to reduce the number of times code must be retrieved from bulk storage during execution.

In another embodiment, the disclosure provides a method of generating a system for system validation. In this case, a computer infrastructure, such as computer infrastructure 102 (FIG. 2), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 2), from a computer-readable medium; (2) adding one or more computing devices to the computer infrastructure; and (3) incorporating and/or modifying one or more existing systems of the computer infrastructure, to enable the computer infrastructure to perform the process steps of the disclosure.

In still another embodiment, the disclosure provides a business method that performs the process described herein on a subscription, advertising, and/or fee basis. That is, a service provider, such as an application service provide, could offer to validate system(s), as described herein. In this case, the service provider can manage (e.g., create, maintain, support, etc.) a computer infrastructure, such as computer infrastructure 102 (FIG. 2), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A method of validating at least one of a plurality of systems, the method comprising:
establishing, on a computing device, a validation program template defining a style of input/output usable by a plurality of root functions to be performed by at least one of the plurality of systems, wherein each root function is a fundamental function that a system, with an input, performs to produce an output;
generating, on the computing device, a validation program for each of the plurality of root functions based on the validation program template;
establishing, on the computing device, a markup language representation of each of the plurality of validation programs and corresponding root function;
depicting, on the computing device, a composite validation program for a composite function including a plurality of root functions using the markup language representation of the plurality of validation programs for the plurality of root functions in the composite function; and
validating, on the computing device, at least one of the plurality of systems by validating the composite function using the validation programs depicted in the composite validation program.

2. The method of claim 1, wherein the markup language includes one of: extensible markup language (XML), standard generalized markup language (SGML) or IBM generalized markup language (GML).

3. The method of claim 1, wherein the plurality of root functions includes at least one user function.

4. The method of claim 1, wherein the plurality of root functions includes at least one inter-system function that calls on more than one of the plurality of systems.

5. The method of claim 1, wherein the depicting includes using an output of at least one validation program for a first root function while depicting a validation program of a second root function.

6. The method of claim 1, wherein the validating includes parsing the composite validation program at run time of the validating.

7. The method of claim 6, wherein the parsing includes using a reflection application programming interface (API).

8. The method of claim 1, further comprising:
storing the composite validation program; and
recalling the stored composite validation program to depict another composite function.

9. A system for validating at least one of a plurality of systems, the system comprising:
a validation program (VP) establisher for establishing a validation program template defining a style of input/output usable by a plurality of root functions to be performed by at least one of the plurality of systems, wherein each root function is a fundamental function that a system, with an input, performs to produce an output;
a generator for generating a validation program for each of the plurality of root functions based on the validation program template;
a markup language representation (MLR) establisher for establishing a markup language representation of each of the plurality of validation programs and corresponding root function;
a depicter for depicting a composite validation program for a composite function including a plurality of root functions using the markup language representation of the plurality of validation programs for the plurality of root functions in the composite function; and a validator for validating at least one of the plurality of systems by validating the composite function using the validation programs depicted in the composite validation program.

10. The system of claim 9, wherein the markup language includes one of: extensible markup language (XML), standard generalized markup language (SGML) or IBM generalized markup language (GML).

11. The system of claim 9, wherein the plurality of root functions includes at least one user function.

12. The system of claim 9, wherein the plurality of root functions includes at least one inter-system function that calls on more than one of the plurality of systems.

13. The system of claim 9, wherein the depicter uses an output of at least one validation program for a first root function while depicting a validation program of a second root function.

14. The system of claim 9, wherein the validator includes a parser for parsing the composite validation program at run time of the validating.

15. The system of claim 14, wherein the parser includes a reflection application programming interface (API).

16. The system of claim 9, further comprising:
a component for storing the composite validation program; and
a component for recalling the stored composite validation program to depict another composite function.

17. A program product stored on a computer-readable storage medium, which when executed, validates at least one of a plurality of systems, the program product comprising program code for performing the following:
establishing a validation program template defining a style of input/output usable by a plurality of root functions to be performed by at least one of the plurality of systems, wherein each root function is a fundamental function that a system, with an input, performs to produce an output;
generating a validation program for each of the plurality of root functions based on the validation program template;
establishing a markup language representation of each of the plurality of validation programs and corresponding root function;
depicting a composite validation program for a composite function including a plurality of root functions using the markup language representation of the plurality of validation programs for the plurality of root functions in the composite function; and
validating at least one of the plurality of systems by validating the composite function using the validation programs depicted in the composite validation program.

18. The program product of claim 17, wherein the plurality of root functions includes at least one user function and at least one inter-system function that calls on more than one of the plurality of systems.

19. The program product of claim 17, wherein the depicting includes using an output of at least one validation program for a first root function while depicting a validation program of a second root function.

20. The program product of claim 17, further comprising program code for performing the following:
storing the composite validation program; and
recalling the stored composite validation program to depict another composite function.

* * * * *